US009594572B2

(12) United States Patent
Shen et al.

(10) Patent No.: US 9,594,572 B2
(45) Date of Patent: Mar. 14, 2017

(54) ELECTRONIC APPARATUS AND METHOD FOR RESUMING FROM HIBERNATION

(71) Applicant: INDUSTRIAL TECHNOLOGY RESEARCH INSTITUTE, Hsinchu (TW)

(72) Inventors: Tzu-Chieh Shen, Taipei (TW); Kuo-Hung Lin, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 169 days.

(21) Appl. No.: 14/300,345

(22) Filed: Jun. 10, 2014

(65) Prior Publication Data

US 2015/0186151 A1    Jul. 2, 2015

(30) Foreign Application Priority Data

Dec. 27, 2013   (TW) .............................. 102148783 A

(51) Int. Cl.
    *G06F 9/44*   (2006.01)
(52) U.S. Cl.
    CPC ................... *G06F 9/4418* (2013.01)
(58) Field of Classification Search
    CPC .................................................... G06F 9/4418
    USPC ........................................................ 713/300
    See application file for complete search history.

(56) References Cited

U.S. PATENT DOCUMENTS

| 6,792,556 | B1  | 9/2004  | Dennis         |             |
|-----------|-----|---------|----------------|-------------|
| 7,634,592 | B2  | 12/2009 | Kadatch et al. |             |
| 7,971,081 | B2  | 6/2011  | Cooper et al.  |             |
| 2004/0143696 | A1 | 7/2004 | Hsieh          |             |
| 2005/0086551 | A1 | 4/2005 | Wirasinghe et al. |          |
| 2009/0157960 | A1* | 6/2009 | Koga ................. | G06F 11/3485 711/115 |
| 2010/0174934 | A1 | 7/2010 | Zhao et al.    |             |
| 2010/0211750 | A1* | 8/2010 | Yamauchi ........... | G06F 12/1009 711/154 |
| 2011/0055541 | A1 | 3/2011  | Lee et al.     |             |

(Continued)

FOREIGN PATENT DOCUMENTS

JP    2009-146061 A    7/2009
JP    2010-191789 A    9/2010

(Continued)

OTHER PUBLICATIONS

Japanese Office Action with translation dated Oct. 27, 2015.

(Continued)

*Primary Examiner* — Thomas Lee
*Assistant Examiner* — Sumil Desai
(74) *Attorney, Agent, or Firm* — Rabin & Berdo, P.C.

(57) ABSTRACT

An electronic apparatus and a method for resuming from hibernation are disclosed. The electronic apparatus comprises an external storage, a main memory, an image generating circuit and a page moving circuit. The image generating circuit writes pages from the main memory into the external storage to generate a hibernation image file during a hibernation process. The page moving circuit according to the hibernation image file sequentially writes the pages from the external storage back to a continuous page range of the main memory during a resume process. The resume process is later than the hibernation process.

18 Claims, 20 Drawing Sheets

(56) References Cited

U.S. PATENT DOCUMENTS

| 2012/0084547 | A1 | 4/2012 | Jung et al. |
| 2012/0144177 | A1 | 6/2012 | Iyigun et al. |
| 2012/0311240 | A1* | 12/2012 | Kato ............... G06F 9/4418 711/103 |

FOREIGN PATENT DOCUMENTS

| JP | 2012-252576 A | 12/2012 |
| TW | 544628 B | 8/2003 |
| TW | 200627142 A | 8/2006 |
| TW | 201111966 A | 4/2011 |
| TW | M412423 U | 9/2011 |
| TW | 201137749 A | 11/2011 |
| TW | 201202932 A | 1/2012 |
| TW | 201327160 A | 7/2013 |

OTHER PUBLICATIONS

Taiwanese Office Action dated Nov. 12, 2014.

Hyung Ho Chung et al., "A Study on the Packaging for Fast Boot-up Time in the Embedded Linux" 13th IEEE International Conference on Embedded and Real-Time Computing Systems and Applications, RTCSA 2007, pp. 89-94, Aug. 2007.

Ying-Wen Bai et al., "Design and Implementation of an Instantaneous Turning-on Mechanism for PCs" IEEE Transactions on Consumer Electronics, vol. 53, Issue 4, pp. 1595-1601, Nov. 2007.

Kunhoon Baik et al., "Boosting up Embedded Linux device: experience on Linux-based Smartphone" 2010 Linux Symposium, Jul. 2010.

Inwhee Joe et al., "Bootup Time Improvement for Embedded Linux using Snapshot Images Created on Boot Time" 2011 The 2nd International Conference on Next Generation Information Technology (ICNIT), pp. 193-196, Jun. 2011.

Gaurav Singh et al., "Optimizing the Boot Time of Android on Embedded System" 2011 IEEE 15th International Symposium on Consumer Electronics (ISCE), pp. 503-508, Jun. 2011.

Shi-Wu Lo et al., "Swap-before-Hibernate: A Time Efficient Method to Suspend an OS to a Flash drive" SAC '10 Proceedings of the 2010 ACM Symposium on Applied Computing, pp. 201-205, Mar. 2010.

* cited by examiner

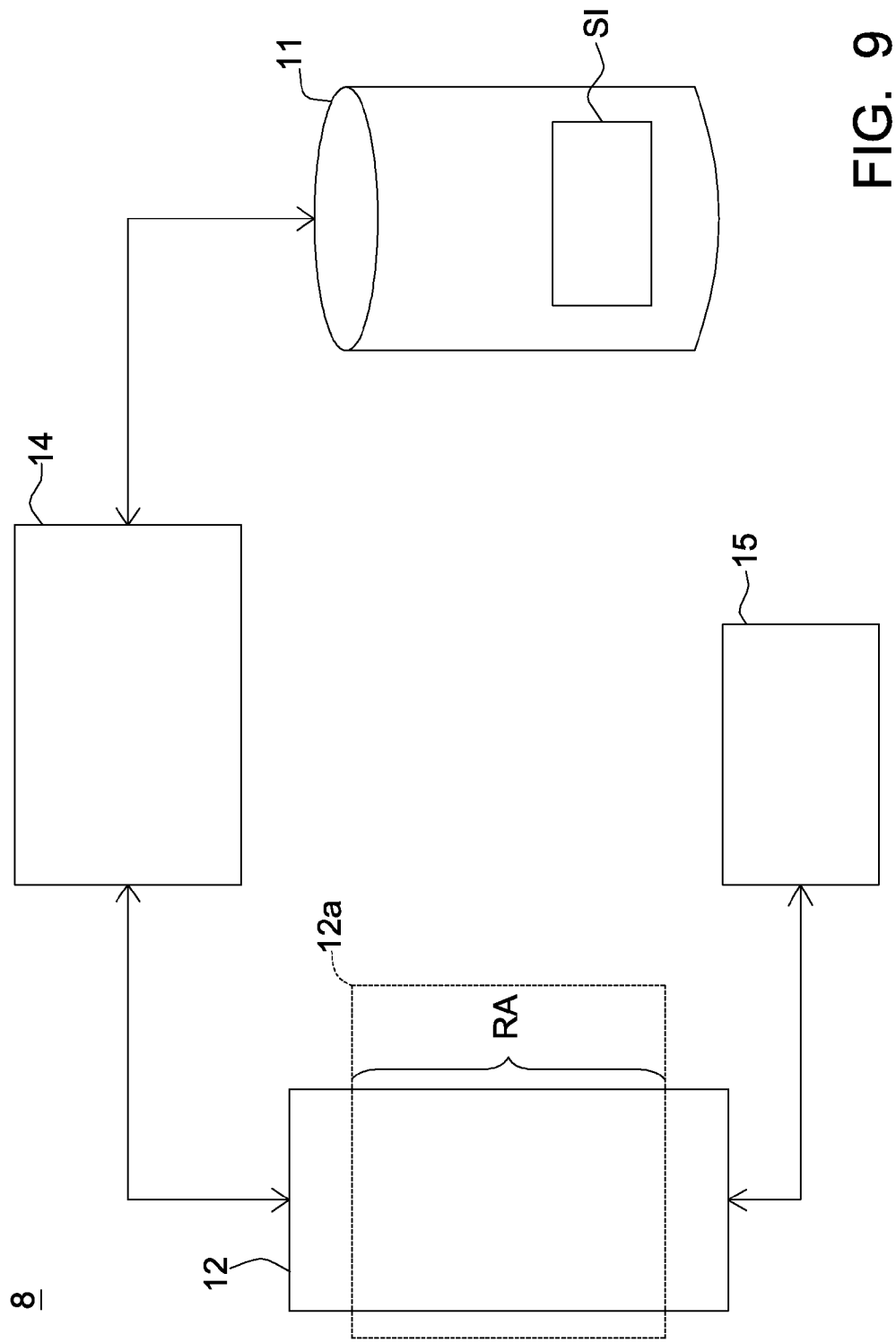

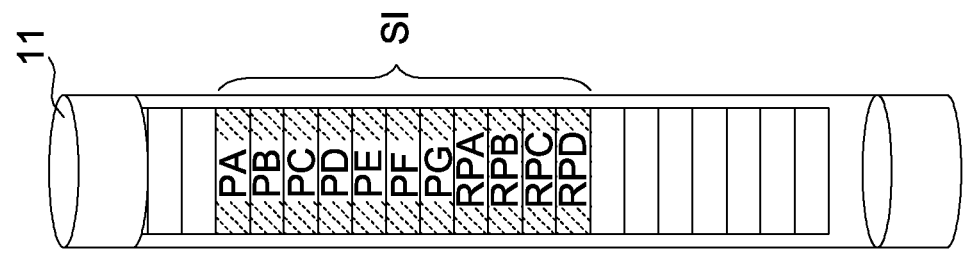
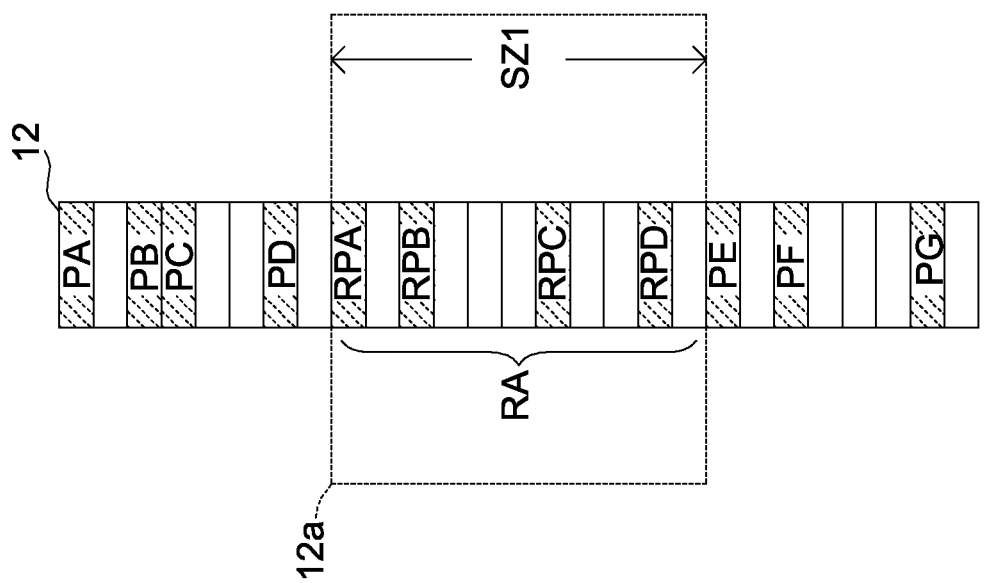
FIG. 11

ELECTRONIC APPARATUS AND METHOD FOR RESUMING FROM HIBERNATION

CROSS-REFERENCE TO RELATED APPLICATION

This application claims the benefit of Taiwan application Serial No. 102148783, filed Dec. 27, 2013, the disclosure of which is incorporated by reference herein in its entirety.

TECHNICAL FIELD

The disclosure relates to an electronic apparatus and a method for resuming from hibernation.

BACKGROUND

With the accelerated pace of life, the fast boot of the electronic apparatus becomes more important. Most smart apparatuses have the shutdown buttons set as in a standby mode, which is, however, not the real shutdown mode. Although the standby mode can effectively shorten the waiting time, the overall electronic system still continuously consumes the electric power, and such the skill pertains to the "power-hungry fast boot." The electric power consumed in the standby mode increases the worldwide carbon dioxide emission by 1%. European Union has decided that the power consumption of the smart home appliance upon shutdown must be smaller than 0.1 watts. Therefore, it is necessary to develop a fast boot method in the hibernation, power-off or shutdown mode to replace the power-consumptive standby/wake mode. The hibernation/wake-up mode is a feasible solution. However, the conventional method for resuming from hibernation is writing pages into a page buffer one by one upon boot, and then copies the pages from the page buffer to target pages of the main memory one by one, wherein the processes are quite time-consuming, and the current industry needs a new fast wake-up and boot method.

SUMMARY

The disclosure is directed to an electronic apparatus and a method for resuming from hibernation.

According to one embodiment, a method for resuming from hibernation is provided. The method for resuming from hibernation comprises: writing a plurality of pages from a main memory to an external storage to generate a hibernation image file during a hibernation process; and sequentially writing the pages from the external storage back to a continuous page range of the main memory according to the hibernation image file during a resume process. The resume process is later than the hibernation process.

According to another embodiment, an electronic apparatus is provided. The electronic apparatus comprises an external storage, a main memory, an image generating circuit and a page moving circuit. The image generating circuit writes a plurality of pages from the main memory to the external storage to generate a hibernation image file during a hibernation process. The page moving circuit sequentially writes the pages from the external storage back to a continuous page range of the main memory according to the hibernation image file during a resume process. The resume process is later than the hibernation process.

According to an alternative embodiment, a method for resuming from hibernation is provided. The method for resuming from hibernation comprises: writing a plurality of pages from a main memory to an external storage to generate a hibernation image file, and updating a first page table associating with the pages to a second page table during a hibernation process; and writing the pages from the external storage back to positions of the pages, matched with the second page table, in a main memory according to a head of the hibernation image file or page information heads for the pages during a resume process. The resume process is later than the hibernation process.

According to an alternative embodiment, an electronic apparatus is provided. The electronic apparatus comprises an external storage, a main memory, an image generating circuit and a page moving circuit. The image generating circuit writes a plurality of pages from the main memory to the external storage to generate a hibernation image file and updates a first page table associating with the pages to a second page table during a hibernation process. The page moving circuit writes the pages from the external storage back to positions of the pages, recorded by the second page table, in the main memory according to a head of the hibernation image file or page information heads for the pages during a resume process. The resume process is later than the hibernation process.

According to an alternative embodiment, a method for resuming from hibernation is provided. The method for resuming from hibernation comprises: writing a plurality of pages from a main memory to an external storage through a first processing unit or a second processing unit to generate a hibernation image file during a hibernation process; and executing a core loading and initializing process through the first processing unit and parallelly moving the pages of the hibernation image file to the main memory through the second processing unit during a resume process. The resume process is later than the hibernation process.

According to an alternative embodiment, an electronic apparatus is provided. The electronic apparatus comprises an external storage, a main memory, a first processing unit and a second processing unit. The first processing unit or the second processing unit writes a plurality of pages from the main memory to the external storage to generate a hibernation image file during a hibernation process. The first processing unit executes a core loading and initializing process and the second processing unit moves the pages of the hibernation image file to the main memory in parallel during a resume process. The resume process is later than the hibernation process.

According to an alternative embodiment, an electronic apparatus is provided. The electronic apparatus comprises an external storage, a main memory and a central processing unit (CPU). The CPU writes a plurality of pages to the external storage to generate a hibernation image file during a hibernation process, and sequentially writes the pages from the external storage back to a continuous page range of the main memory according to the hibernation image file during a resume process. The resume process is later than the hibernation process.

According to an alternative embodiment, an electronic apparatus is provided. The electronic apparatus comprises an external storage, a main memory and a central processing unit (CPU). The CPU writes a plurality of pages from the main memory to the external storage to generate a hibernation image file and updates a first page table associating with the pages to a second page table during a hibernation process, and writes the pages from the external storage back to positions of the pages, recorded by the second page table, in the main memory according to a head of the hibernation image file or page information heads for the pages during a resume process. The resume process is later than the hibernation process.

BRIEF DESCRIPTION OF THE DRAWINGS

FIG. 9 shows a block diagram of an electronic apparatus according to a third embodiment.

FIG. 11 shows a schematic view illustrating a main memory and an external storage during a hibernation process according to a fourth embodiment.

Figure 1:
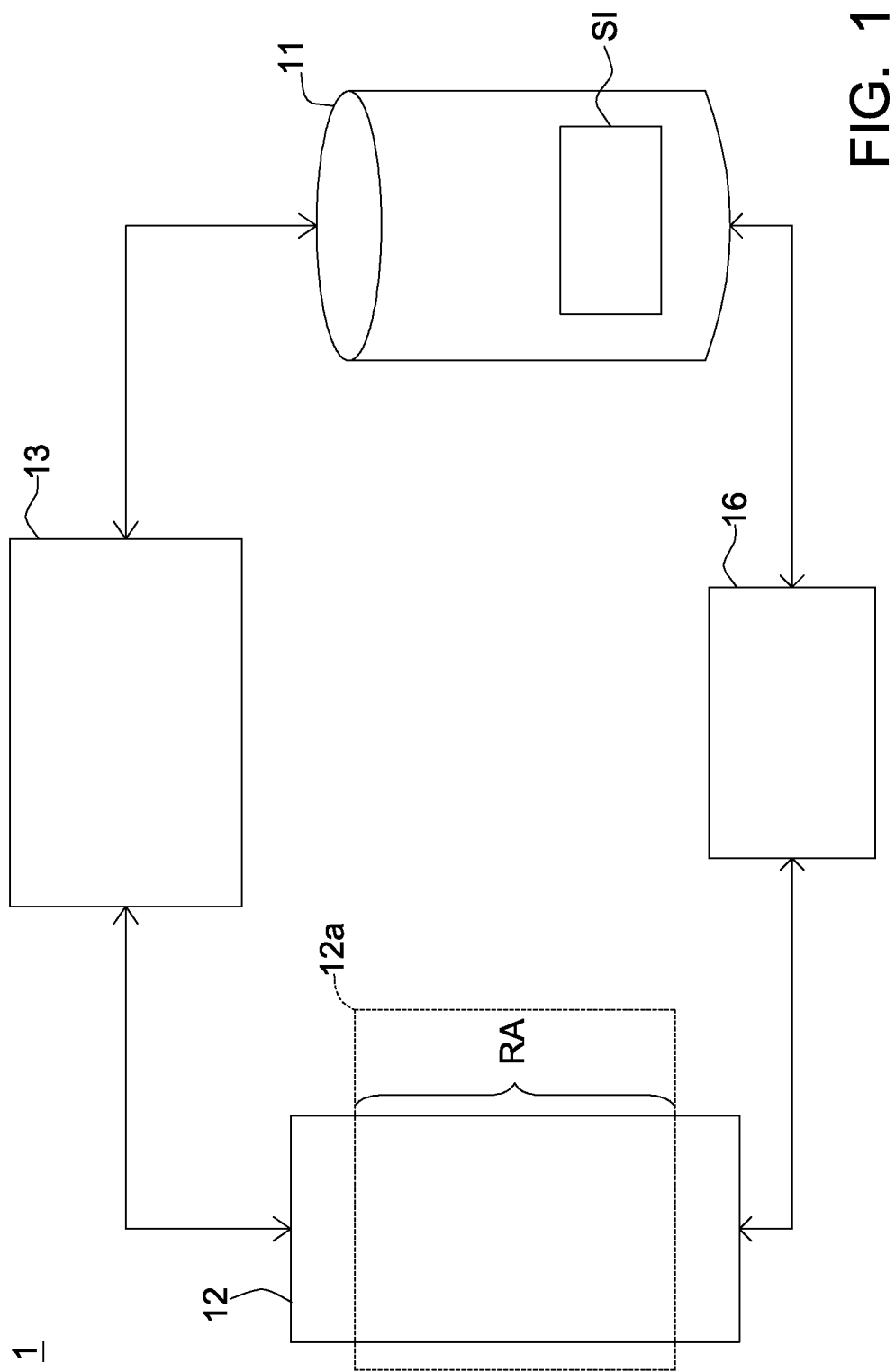
FIG. 1 shows a block diagram of an electronic apparatus according to a first embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

First Embodiment

FIG. 1 shows a block diagram of an electronic apparatus 1 according to the first embodiment. Referring to FIG. 1, the electronic apparatus 1 comprises an external storage 11, a main memory 12, an image generating circuit 13 and a page moving circuit 16. The electronic apparatus 1 is, for example, a mobile phone, a tablet computer, a notebook computer, a smart television, a vehicle computer or any other handheld apparatus, while the external storage 11 is, for example, a hard disk drive, a flash memory or a volatile memory. The image generating circuit 13 is implemented by, for example, a central processing unit (CPU), while the page moving circuit 16 is implemented by, for example, a CPU, a digital signal processor (DSP) or a direct memory access (DMA) controller. In one embodiment, the image generating circuit 13 and the page moving circuit 16 are the same circuitry, such as the same CPU.

During the hibernation process, the image generating circuit 13 writes pages from the main memory 12 into the external storage 11 to generate a hibernation image file SI. During the hibernation process, the image generating circuit 13 updates a first page table to a second page table according to a relative position of the pages of the hibernation image file in a continuous page range RA of the main memory 12. The first page table is an original page table, and a second page table is a new page table. During the hibernation process, the image generating circuit 13 stores recovery information into a hibernation file head. The first table associates with page address. In one embodiment, the first page table is used to record the position of the pages before the pages are moved to the continuous page range RA, and the second page table is used to record the position of the pages before the pages are moved to the continuous page range RA. The image generating circuit 13 writes pages into the external storage 11 to generate the hibernation image file SI during the hibernation process. The page moving circuit 16 sequentially writes the pages from the external storage 11 back to the continuous page range RA of the main memory 12 according to the hibernation image file SI during the resume process. The resume process is later than the hibernation process. Furthermore, the page moving circuit 16 sequentially writes the pages from the external storage 11 back to the continuous page range RA of the main memory 12 according to the head of the hibernation image file SI or the page information heads for the pages during the resume process. The page addresses corresponds to the continuous page range RA are recorded by the second page table.

The target address where the page is written from the external storage 11 back to the main memory 12 is recorded in the head of the hibernation image file SI. The page moving circuit 16 transmits the hibernation image file SI by way of one-time sequential transmission. The pages of the hibernation image file SI are sequentially placed in the external storage 11 without other data between the pages. After the pages of the hibernation image file SI are written back to the main memory 12, the position of each page in the main memory 12 matches with the position recorded by the second page table. The continuous page range RA of the main memory 12 is, for example, the page range of a cache region 12a of the main memory 12. In one embodiment, the page moving circuit 16 transmits the hibernation image file SI by way of non-sequential transmission. The page moving circuit 16 writes the pages from the external storage 11 back to the main memory 12 one-by-one according to the head of the hibernation image file SI or the page information heads for the pages, wherein the position of each page in the main memory 12 matches with the position recorded by the second page table. The wake-up method is applicable to the electronic apparatus 1 and comprises the following boot process and shutdown process.

Figure 2:
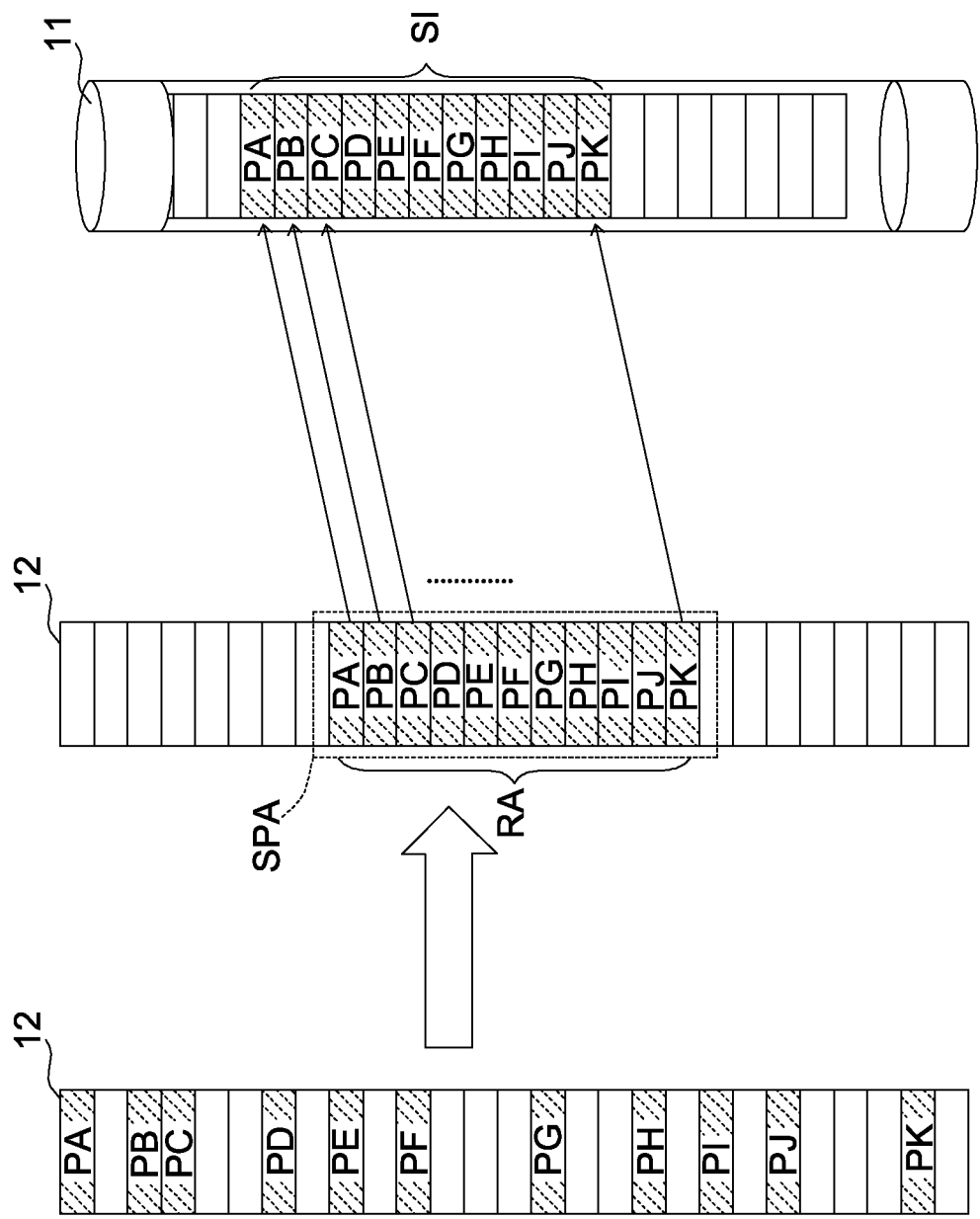
FIG. 2 shows a schematic view illustrating a main memory and an external storage during a hibernation process according to the first embodiment.
Figure 3:
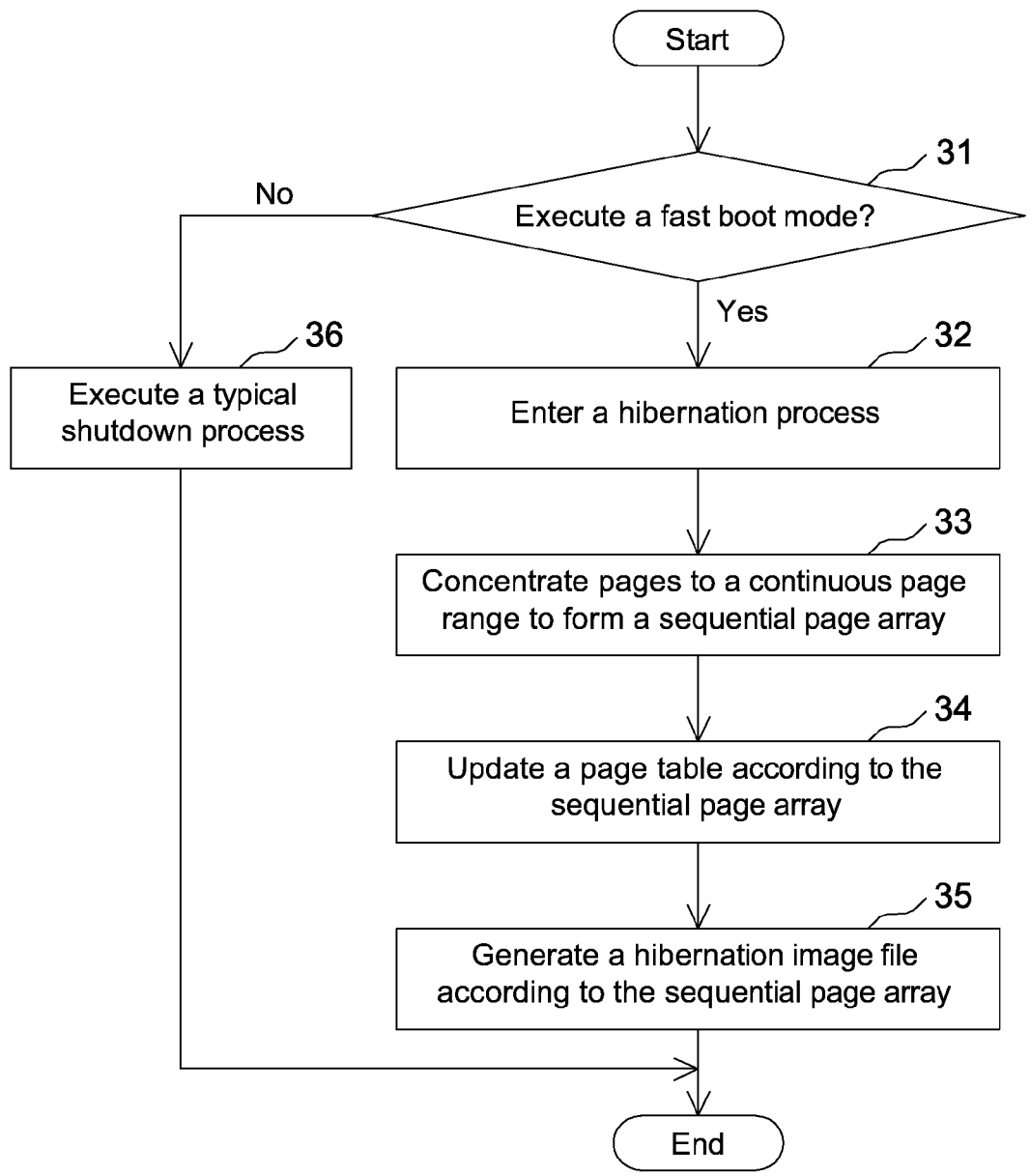
FIG. 3 shows a shutdown flow chart according to the first embodiment.

FIG. 2 shows a schematic view illustrating a main memory and an external storage during a hibernation process according to the first embodiment. FIG. 3 shows a shutdown flow chart according to the first embodiment.

Please refer to FIGS. 1 to 3. First, as shown in step 31, the CPU (may be the CPU implementing the image generating circuit 13, the CPU implementing the page moving circuit 16, or another CPU in the apparatus 1) judges whether to execute a fast boot mode. If the fast boot mode is to be executed, then step 32 is executed. As shown in the step 32, the electronic apparatus 1 enters the hibernation process. Next, as shown in step 33, the image generating circuit 13 concentrates pages PA-PK to the continuous page range RA to form a sequential page array SPA during the hibernation process. The pages PA-PK are, for example, user space pages. Next, as shown in step 34, the image generating circuit 13 updates the first page table to the second page table according to the sequential page array SPA during the hibernation process. It is to be noted that, because of concentrating pages to pages PA-PK, the physical positions of the pages have been changed, thus the first page table is correspondingly updated to the second page table.

Next, as shown in step 35, the image generating circuit 13 generates the hibernation image file SI according to the sequential page array SPA. That is, the image generating circuit 13 sequentially writes the pages PA-PK of the main memory 12 into the external storage 11 by way of sequential I/O to generate the hibernation image file SI. The pages PA-PK may be concentrated using different concentrating methods, such as concentration at head/top, concentration at tail/end or specific-region concentration. The continuous page range RA is, for example, a non-fixed memory address space, and is formed by performing a page migration in a previous hibernation process. That is, the continuous page range RA may be the memory position of the main memory 12, where the previous hibernation image file is stored, in the previous hibernation process. On the contrary, if the fast boot mode is not to be executed, then step 36 is executed. As shown in the step 36, the CPU executes the typical shutdown process.

Figure 4:
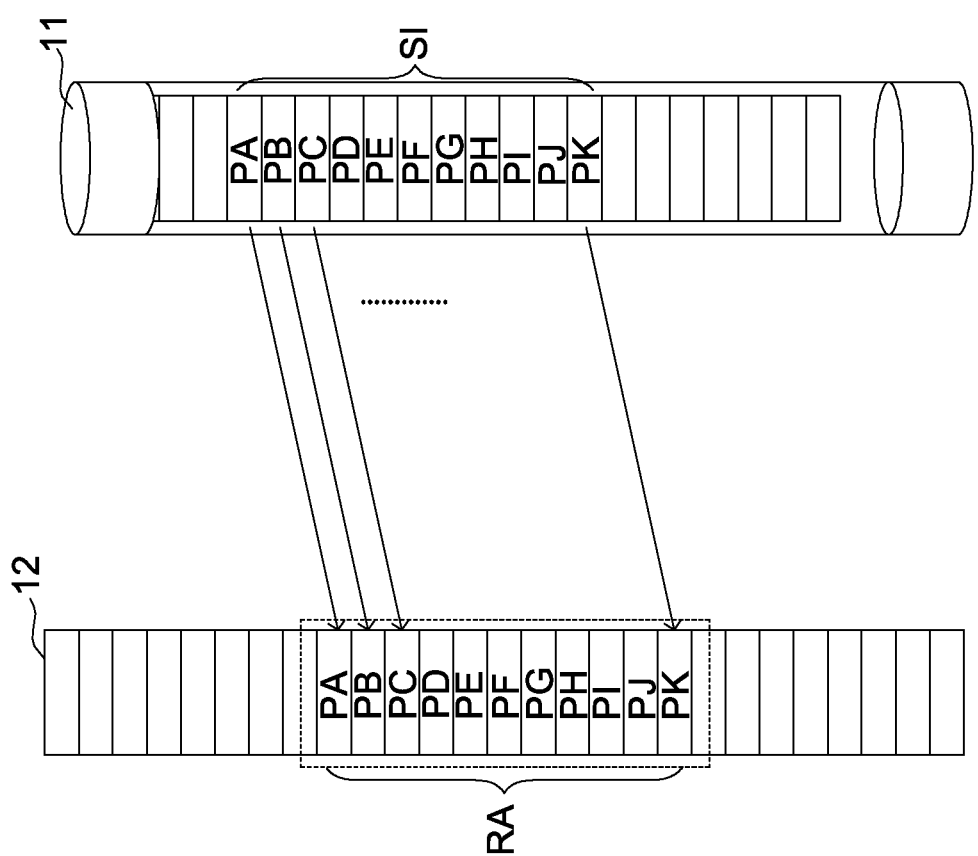
FIG. 4 shows a schematic view illustrating the main memory and the external storage during a resume process.
Figure 5:
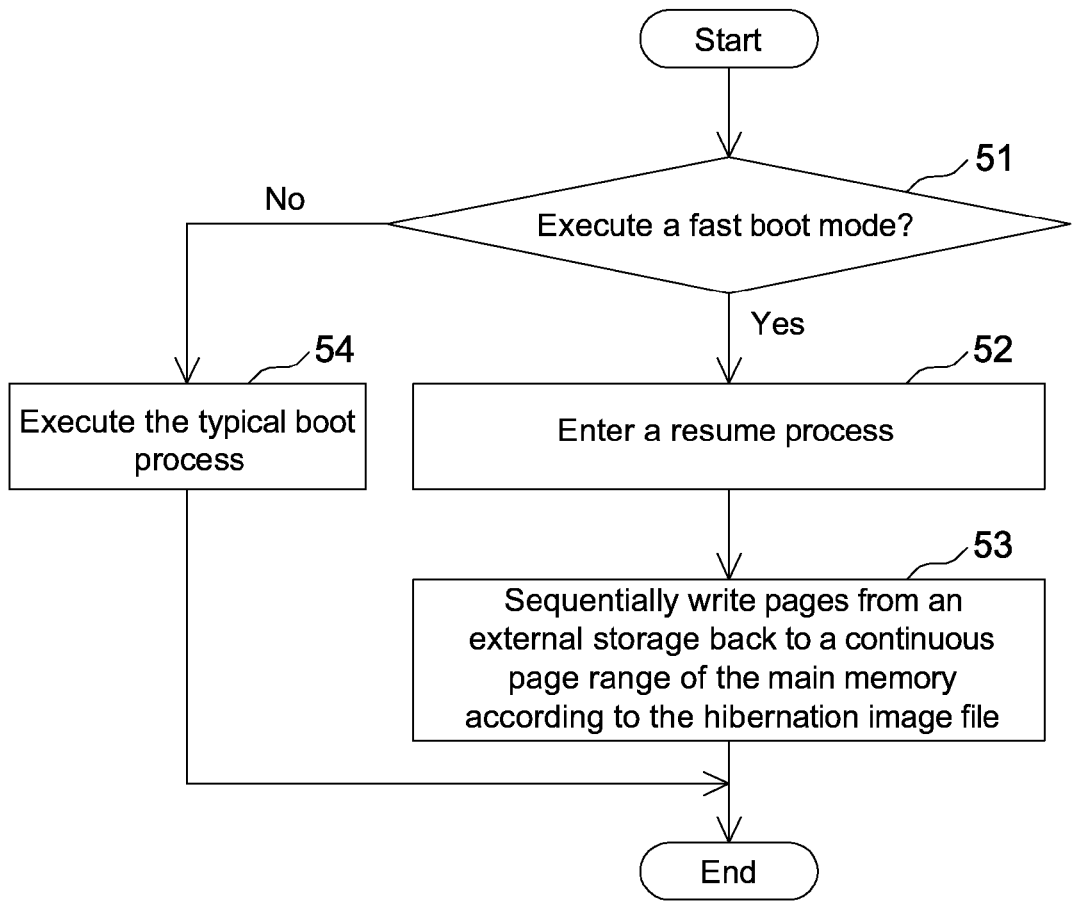
FIG. 5 shows a boot flow chart according to the first embodiment.

FIG. 4 shows a schematic view illustrating the main memory and the external storage during a resume process. FIG. 5 shows a boot flow chart according to the first embodiment. Please refer to FIGS. 1, 4 and 5. First, as shown in step 51, the CPU judges whether to execute the fast boot mode. If the fast boot mode is to be executed, then step 52 is executed. As shown in the step 52, the electronic apparatus 1 enters the resume process. Next, as shown in step 53, the page moving circuit 16 sequentially writes the pages PA-PK from the external storage 11 back to the continuous page range RA of the main memory 12 according to the hibernation image file SI during the resume process. On the contrary, if the fast boot mode is not to be executed, then step 54 is executed. As shown in the step 54, the CPU executes the typical boot process. When the user selects to execute the fast boot mode, the pages PA-PK can be directly sequentially written back to the continuous page range RA of the main memory 12 without using the page buffer. Consequently, the boot time can be shortened, and the boot speed can be increased.

Second Embodiment

Figure 6:
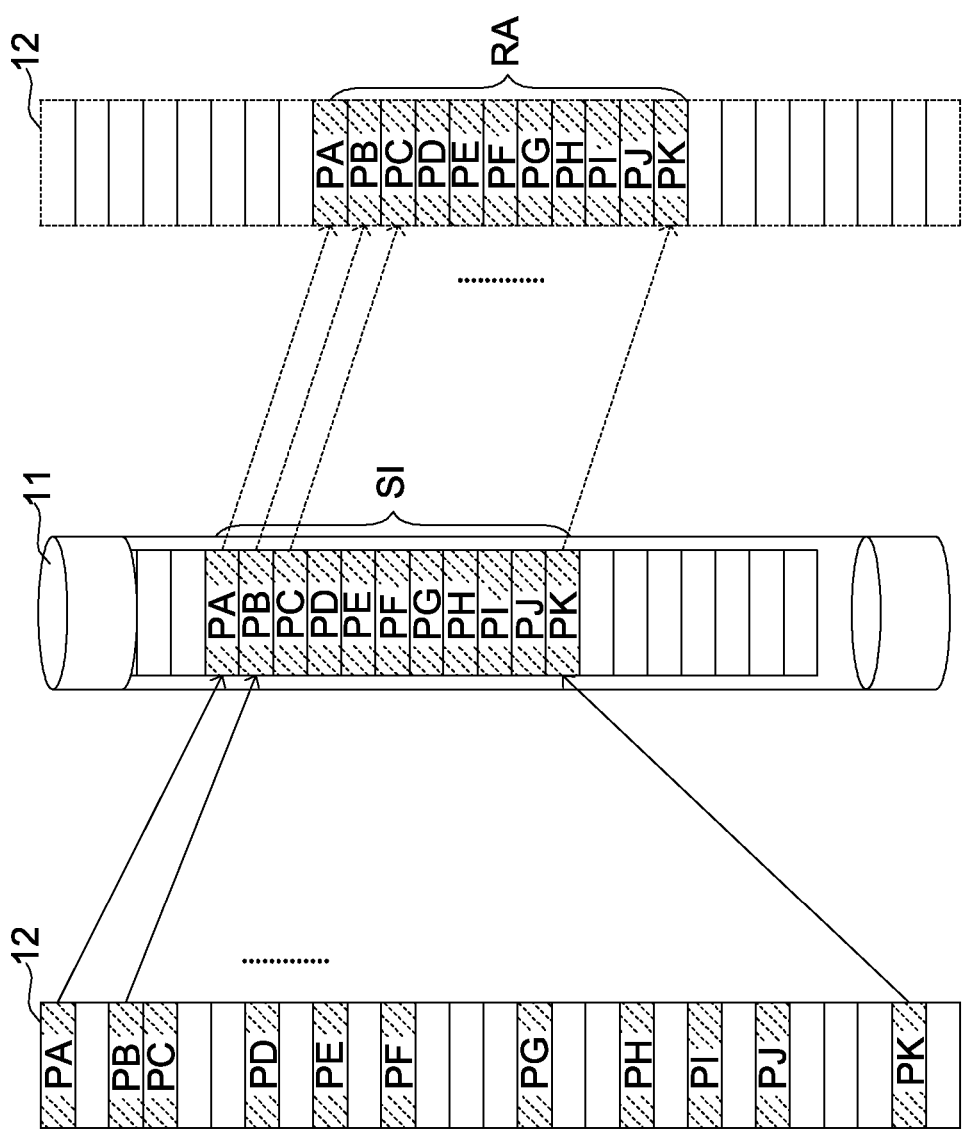
FIG. 6 shows a schematic view illustrating the main memory and the external storage according to a second embodiment.
Figure 7:
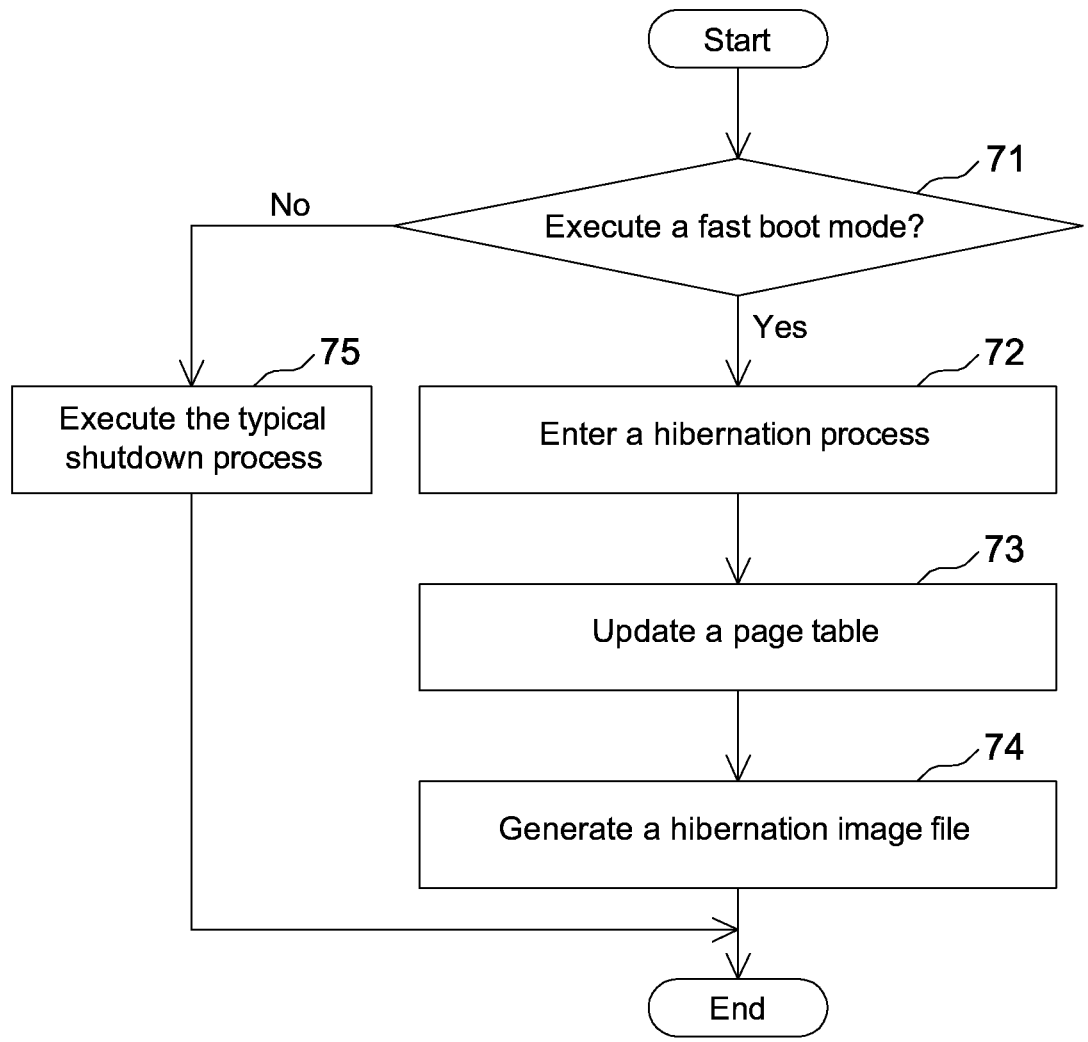
FIG. 7 shows a shutdown flow chart according to the second embodiment.

FIG. 6 shows a schematic view illustrating the main memory and the external storage according to the second embodiment. FIG. 7 shows a shutdown flow chart according to the second embodiment. Please refer to FIGS. 1, 6 and 7. The difference between the second embodiment and the first embodiment mainly resides in that the second embodiment reserves the continuous page range. First, as shown in step 71, the CPU (may be the CPU implementing the image generating circuit 13, the CPU implementing the page moving circuit 16, or another CPU of the apparatus 1) judges whether to execute the fast boot mode. If the fast boot mode is to be executed, then step 72 is executed. As shown in the step 72, the electronic apparatus 1 enters the hibernation process. Next, as shown in step 73, the image generating circuit 13 determines the positions of the pages PA-PK in the continuous page range RA according to the order of the pages PA-PK in the hibernation image file SI during the hibernation process so as to update the first page table to the second page table. Next, as shown in step 74, the image generating circuit 13 sequentially writes the pages PA-PK of the main memory 12 into the external storage 11 by way of sequential I/O to generate the hibernation image file SI. On the contrary, if the fast boot mode is not to be executed, then step 75 is executed. As shown in the step 75, the CPU executes the typical shutdown process.

Figure 8:
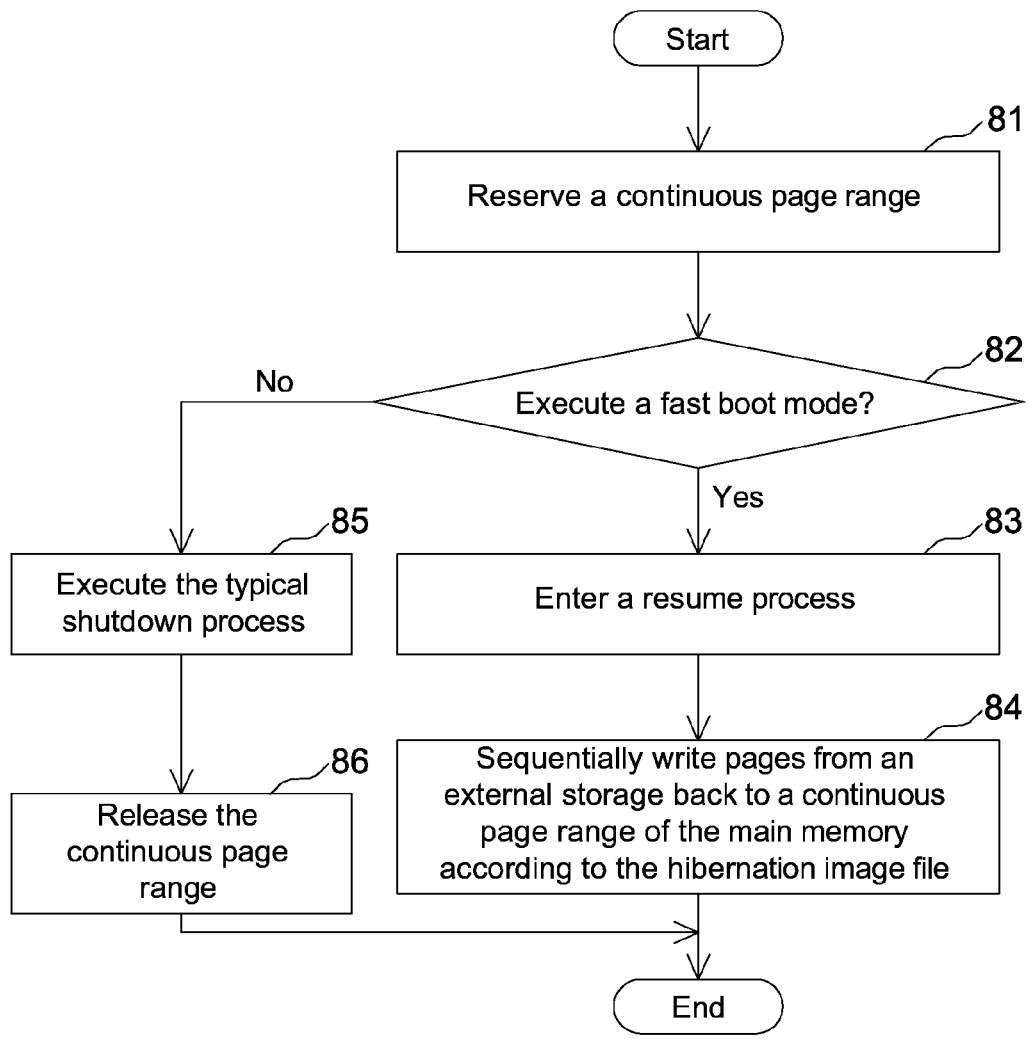
FIG. 8 shows a boot flow chart according to the second embodiment.

FIG. 8 shows a boot flow chart according to the second embodiment. Please refer to FIGS. 1, 6 and 8. First, as shown in step 81, the CPU reserves the continuous page range RA in a core initialization process. The continuous page range RA is, for example, the position recorded by the second page table during the hibernation process and is a fixed memory address space. Next, as shown in step 82, the CPU judges whether to execute the fast boot mode. If the fast boot mode is to be executed, then step 83 is executed. As shown in the step 83, the electronic apparatus 1 enters the resume process. Next, as shown in step 84, the page moving circuit 16 sequentially writes the pages PA-PK from the external storage 11 back to the continuous page range RA of the main memory 12 according to the hibernation image file SI during the resume process. Furthermore, the page moving circuit 16 sequentially writes the pages PA-PK from the external storage 11 back to the positions of the pages PA-PK, recorded by the second page table, in the continuous page range RA of the main memory 12 according to the head of the hibernation image file SI or the page information heads for the pages PA-PK.

On the contrary, if the fast boot mode is not to be executed, then step 85 is executed. As shown in the step 85, the CPU executes the typical boot process. Next, as shown in step 86, the CPU releases the continuous page range RA. Because the continuous page range RA is not needed to be used in the non-fast boot mode, the continuous page range RA may be released and used for other processes. When the user selects to execute the fast boot mode, the pages PA-PK can be directly sequentially written back to the continuous page range RA of the main memory 12 without using the page buffer. Consequently, the boot time can be shortened, and the boot speed can be enhanced.

Third Embodiment

Figure 10A:
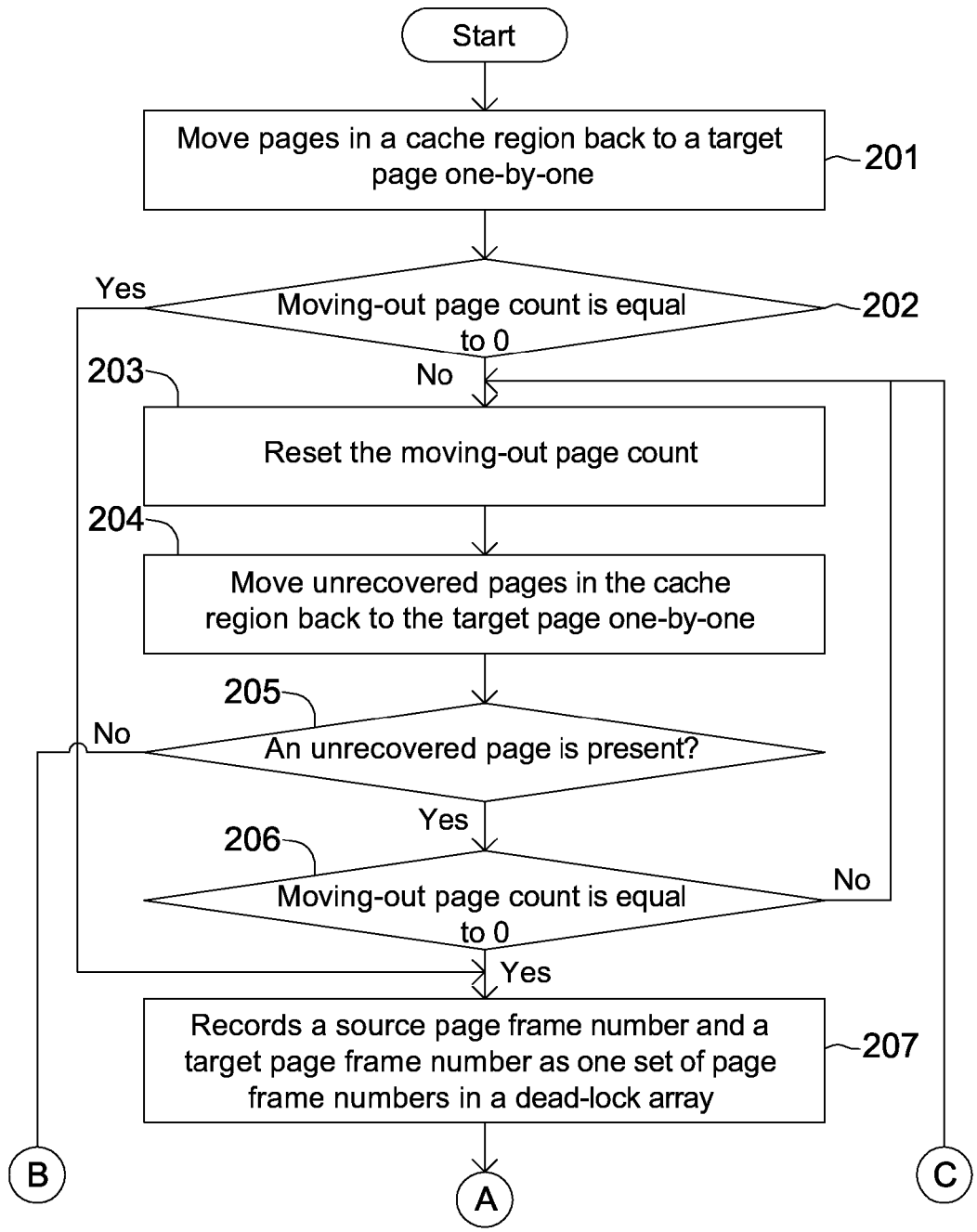
FIGS. 10A and 10B show boot flow charts according to the third embodiment.
Figure 10B:
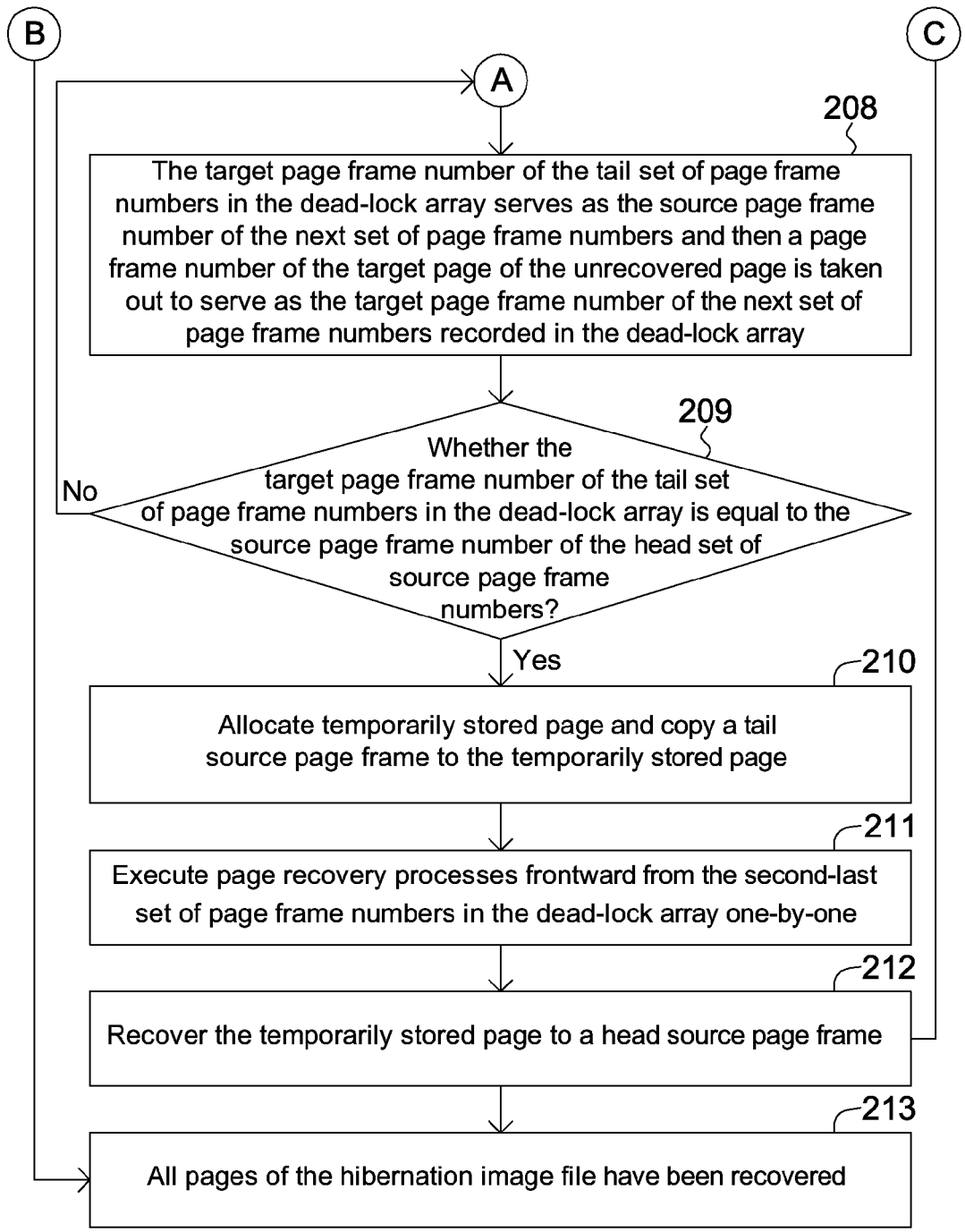

Please refer to Table 1 and FIGS. 1, 9, 10A and 10B, wherein Table 1 is an exemplified form of a dead-lock array. FIG. 9 shows a block diagram of an electronic apparatus according to the third embodiment. FIGS. 10A and 10B show boot flow charts according to the third embodiment. The electronic apparatus 8 comprises an external storage 11, a main memory 12, a processing unit 14 and a processing unit 15. During the hibernation process, the pages are written from the main memory 12 to the external storage 11 to generate the hibernation image file SI by the processing unit 14 or the processing unit 15. During the resume process, the processing unit 14 executes a core loading and initializing process and the processing unit 15 moves the pages of the hibernation image file SI to the main memory 12 in parallel. The processing unit 14 and the processing unit 15 are different cores in a multi-core processor, for example. Alternatively, the processing unit 14 and the processing unit 15 are a central processing unit (CPU) and a direct memory access (DMA) controller, respectively, for example. In addition, the processing unit 14 and the processing unit 15 may also be a CPU and a digital signal processor (DSP), respectively, for example. It is further to be noted that the processing unit 14 and the processing unit 15 may be the image generating circuit 13 and the page moving circuit 16.

During the resume process, the boot process comprises the following steps. After the processing unit 15 has finished writing the pages of the hibernation image file SI in the external storage 11 back to the cache region 12a of the main memory 12 by way of sequential transmission, as shown in step 201, if the processing unit 15 is a different core in the multi-core processor or the DSP, the processing unit 15 can move only one page in the cache region 12a back to the target page once. Then the pages in the cache region 12a are moved back to the target page one-by-one. The DMA controller is not to move only one page in the cache region 12a back to the target page once. If the processing unit 15 is the DMA controller, then the processing unit 14 moves the pages in the cache region 12a back to the target page one-by-one. When this disclosure subsequently describes performing the one-by-one moving operation on the pages, the processing unit 15 is a different core in the multi-core processor or the DSP. When this embodiment subsequently describes performing the one-by-one moving operation on the pages and the processing unit 15 is the DMA controller, the processing unit 14 moves the pages in the cache region 12a back to the target page one-by-one.

The location of the target page is the location of the page in the main memory 12 before the shutdown state. If there exists conflict in the location of the target page, then the next page in the cache region 12a is moved to the target page until the last page of the hibernation image file SI. Next, as shown in step 202, the processing unit 15 checks whether a moving-out page count is 0. The moving-out count represents a page count that the pages move out from the cache region 12a. If the moving-out page count is 0, then step 207 is executed. On the contrary, if the moving-out page count is not 0, then step 203 is executed.

As shown in the step 203, the processing unit 15 resets the moving-out page count. As shown in step 204, the processing unit 15 moves the unrecovered pages in the cache region 12a back to the target page one-by-one from the first unrecovered page of the cache region 12a. If there exists conflict in the location of the target page, then the next page in the cache region 12a is moved to the target page until the last page which has not been moved back to the target page. It is to be specified that when the location of the target page is the same as the location of the other unrecovered page, it means that there exists conflict in the location of the target page. As shown in step 205, the processing unit 15 judges whether the cache region has the unrecovered page. When the cache region has no unrecovered page, step 213 is executed. As shown in the step 213, the recovery of all pages of the hibernation image file SI is completed. On the contrary, when there is one or more unrecovered page in the cache region, step 206 is executed. As shown in the step 206, the processing unit 15 judges whether the moving-out page count is 0. If the moving-out page count is not 0, then the step 203 is executed. On the contrary, if the moving-out page count is 0, then the step 207 is executed.

As shown in the step 207, the processing unit 15 sets the source page frame number as the page frame number (PFN) of the first unrecovered page, and sets the target page frame number as the page frame number of the target page corresponding to the first unrecovered page, and the processing unit 15 records the source page frame number and the target page frame number as one set of page frame numbers in the dead-lock array. As shown in step 208, the processing unit 15 takes the target page frame number of the tail set of page frame numbers in the dead-lock array as the source page frame number of the next set of page frame numbers, and then takes out the page frame number of the target page of the unrecovered page as the target page frame number of the next set of page frame numbers recorded in the dead-lock array. For example, the processing unit 15 takes the tail set of target page frame numbers Z2 in the dead-lock array as the source page frame number, accordingly takes out the target page frame number A2 of the unrecovered page, and then records the target page frame number A2 in the dead-lock array. As shown in step 209, the processing unit 15 judges whether the target page frame number of the tail set of target page frame numbers in the dead-lock array is equal to the source page frame number of the head set of page frame numbers. When the target page frame number of the tail set of page frame numbers in the dead-lock array is unequal to the source page frame number of the head set of page frame numbers, the step 208 is executed.

When the target page frame number of the tail set of page frame numbers in the dead-lock array is equal to the source page frame number of the head set of page frame numbers, step 210 is executed. As shown in step 210, the processing unit 15 allocates a temporarily stored page, and copies a tail source page frame to the temporarily stored page. The tail source page frame corresponds to the source page frame number of the tail set of page frame number in the dead-lock array. As shown in step 211, the processing unit 15 executes the page recovery one-by-one forward from the second-last set of page frame numbers in the dead-lock array. As shown in step 212, the processing unit 15 recovers the temporarily stored page to a head source page frame. The head source page frame corresponds to the source page frame number of the head set of page frame in the dead-lock array. Next, the step 203 is executed. According to the above-mentioned flow, the dead-lock causing a page conflict can be found, and the page with a page conflict can be recovered to the target page after the dead-lock is eliminated.

TABLE 1

| Source page frame number | Target page frame number |
|---|---|
| A1(=Z2) | A2 |
| B1(=A2) | B2 |
| C1(=B2) | C2 |
| D1(=C2) | D2 |
| E1(=D2) | E2 |
| F1(=E2) | F2 |
| G1(=F2) | G2 |
| H1(=G2) | H2 |
| I1(=H2) | I2 |
| J1(=I2) | J2 |
| K1(=J2) | K2 |
| L1(=K2) | L2 |
| M1(=L2) | M2 |
| N1(=M2) | N2 |
| O1(=N2) | O2 |
| P1(=O2) | P2 |
| Q1(=P2) | Q2 |
| R1(=Q2) | R2 |
| S1(=R2) | S2 |

TABLE 1-continued

| Source page frame number | Target page frame number |
|---|---|
| T1(=S2) | T2 |
| U1(=T2) | U2 |
| V1(=U2) | V2 |
| W1(=V2) | W2 |
| X1(=W2) | X2 |
| Y1(=X2) | Y2 |
| Z1(=Y2) | Z2 |

Fourth Embodiment

Figure 12:
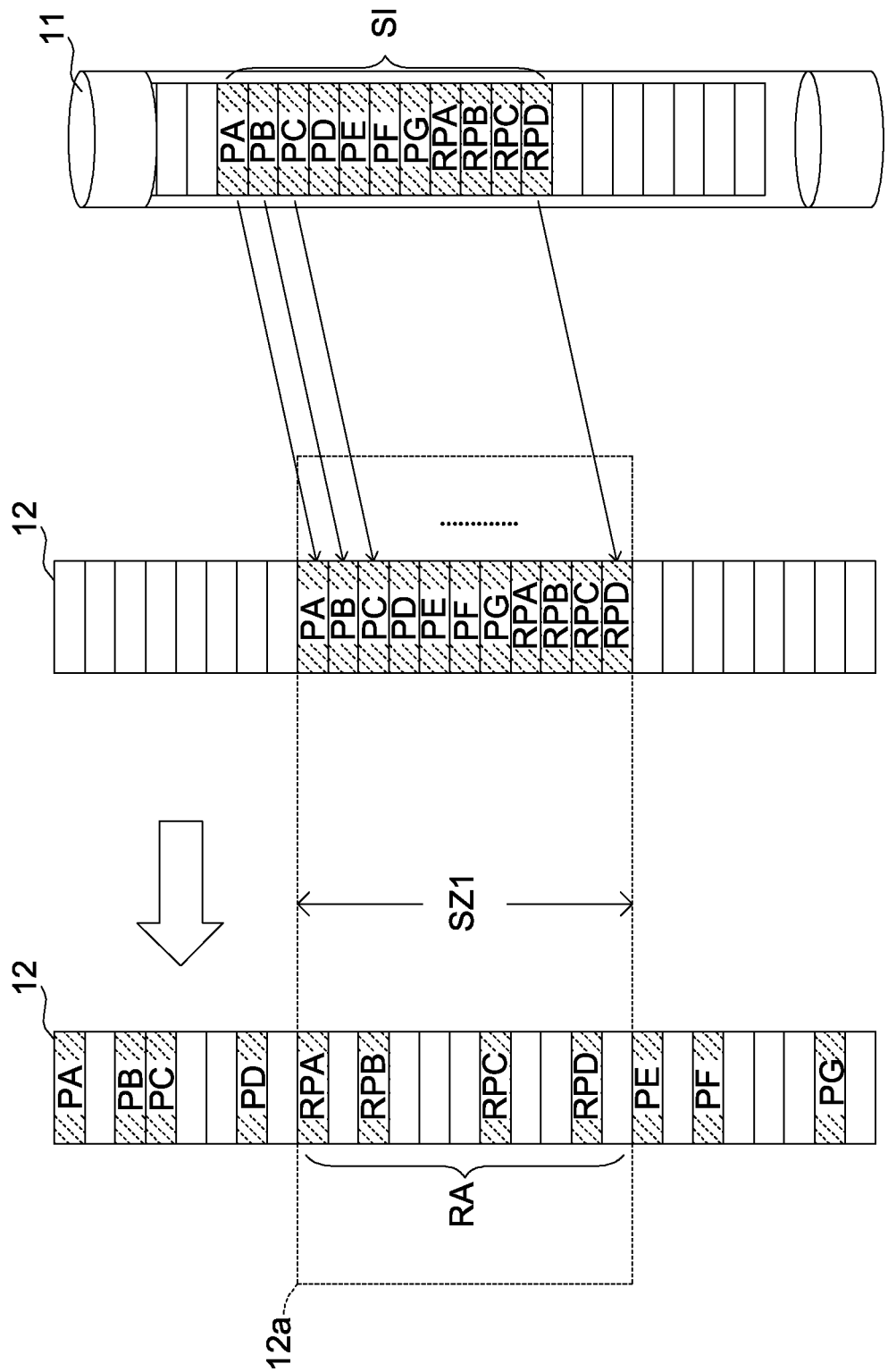
FIG. 12 shows a schematic view illustrating the main memory and the external storage during a resume process according to the fourth embodiment.
Figure 13:
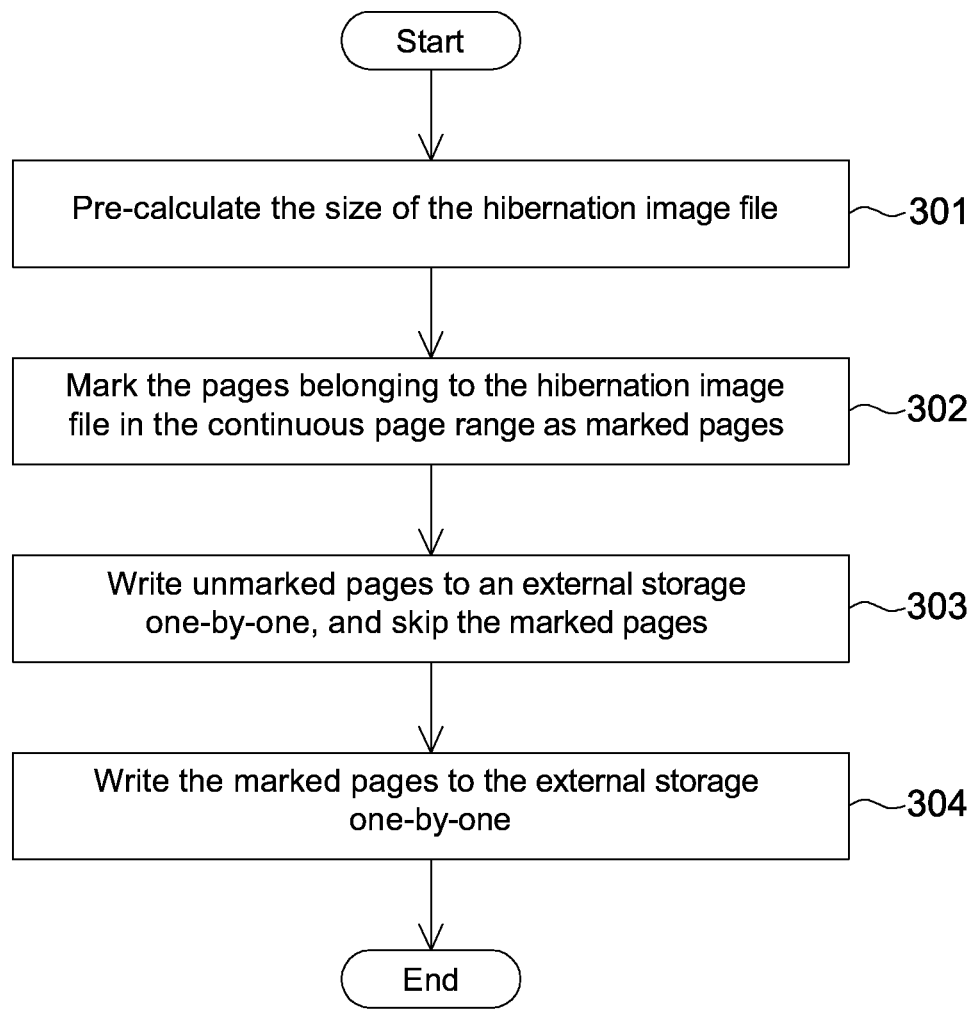
FIG. 13 shows a shutdown flow chart according to the fourth embodiment.

FIG. 11 shows a schematic view illustrating a main memory and an external storage during a hibernation process according to the fourth embodiment. FIG. 12 shows a schematic view illustrating the main memory and the external storage during a resume process according to the fourth embodiment. FIG. 13 shows a shutdown flow chart according to the fourth embodiment. Please refer to FIGS. 9, 11, 12 and 13. As shown in step 301, the processing unit 15 pre-calculates the size SZ1 of the hibernation image file SI. As shown in step 302, the processing unit 15 marks the pages belonging to the hibernation image file SI and being inside the continuous page range RA as the marked pages. The pages belonging to the hibernation image file SI and being outside the continuous page range RA are the unmarked pages. The continuous page range RA starts from the first page in the cache region 12a of the main memory 12 to the size SZ1 of the hibernation image file SI. In the fourth embodiment, the marked pages comprise pages RPA-RPD, while the unmarked pages comprise pages PA-PG.

As shown in step 303, the processing unit 15 writes the unmarked pages to the external storage 11 one-by-one, and skips the marked pages until the last unmarked page. That is, the processing unit 15 writes the pages PA-PG to the external storage 11 one-by-one, and skips the pages RPA, RPB, RPC or RPD. As shown in step 304, the processing unit 15 writes the marked pages to the external storage 11 one-by-one. That is, the processing unit 15 writes the pages RPA-RPD to the external storage 11 one-by-one.

During the resume process, the processing unit 15 moves the pages inside the cache region 12a back to the target page of the main memory 12 one-by-one. That is, the processing unit 15 moves the pages PA, PB, PC, PD, PE, PF, PG, RPA, RPB, RPC and RPD in the cache region 12a back to the target page of the main memory 12 one-by-one. During the resume process, because it is needed to recover to the memory allocation which is the memory allocation before the shutdown state, the pages PA, PB, PC, PD, PE, PF, PG, RPA, RPB, RPC and RPD in the main memory 12 in FIG. 11 are referred to as target pages. It is to be specified that because the target pages of the pages PA-PG are not inside the cache region 12a, the page conflict would not occur. Although the target pages of the pages RPA-RPD are inside the cache region 12a, the pages originally occupied by the pages PA-PG are also released and used for other page recovery because the pages PA-PG have been recovered. So, the pages RPA-RPD do not encounter the page conflict.

Fifth Embodiment

Figure 14:
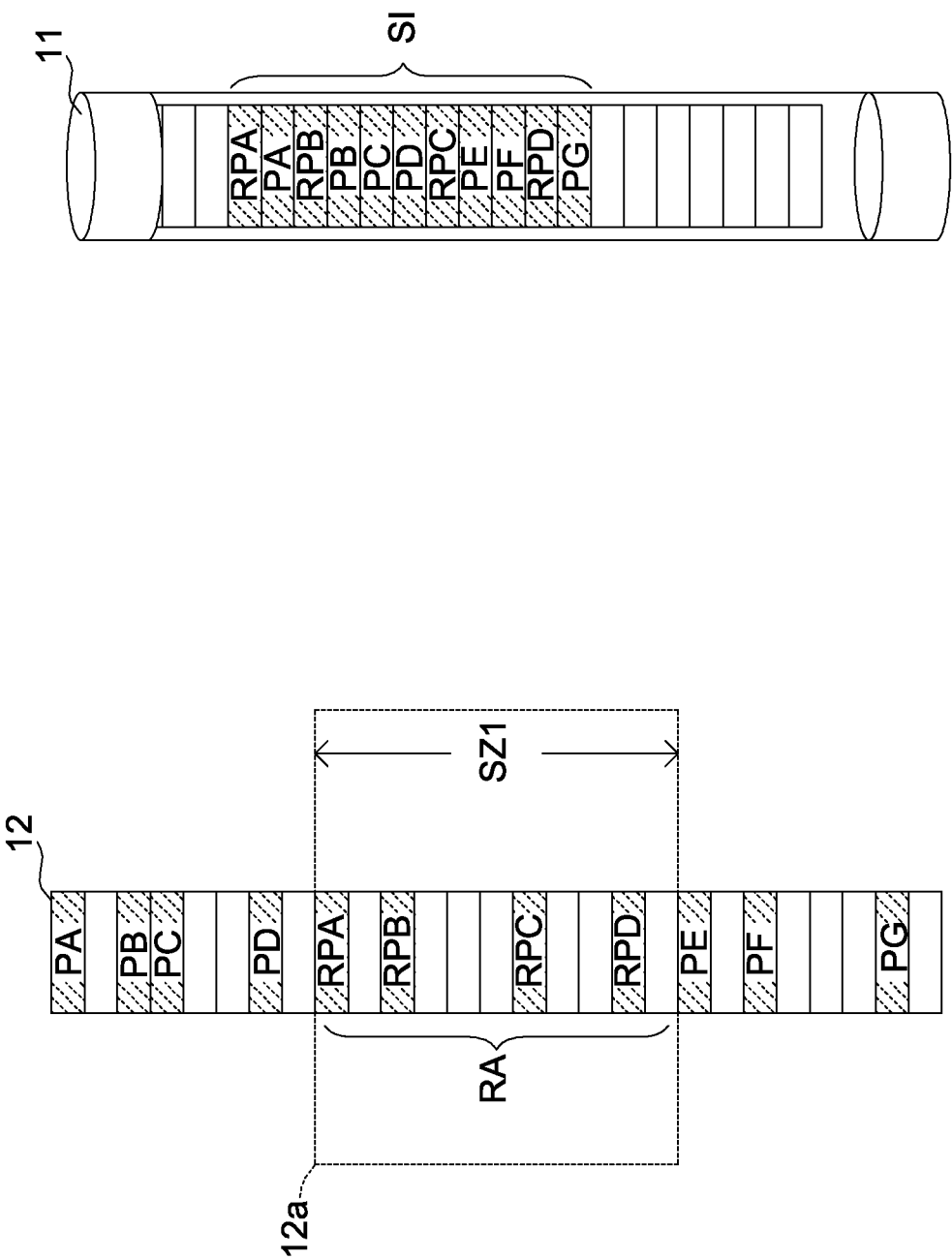
FIG. 14 shows a schematic view illustrating a main memory and an external storage during a hibernation process according to a fifth embodiment.
Figure 15:
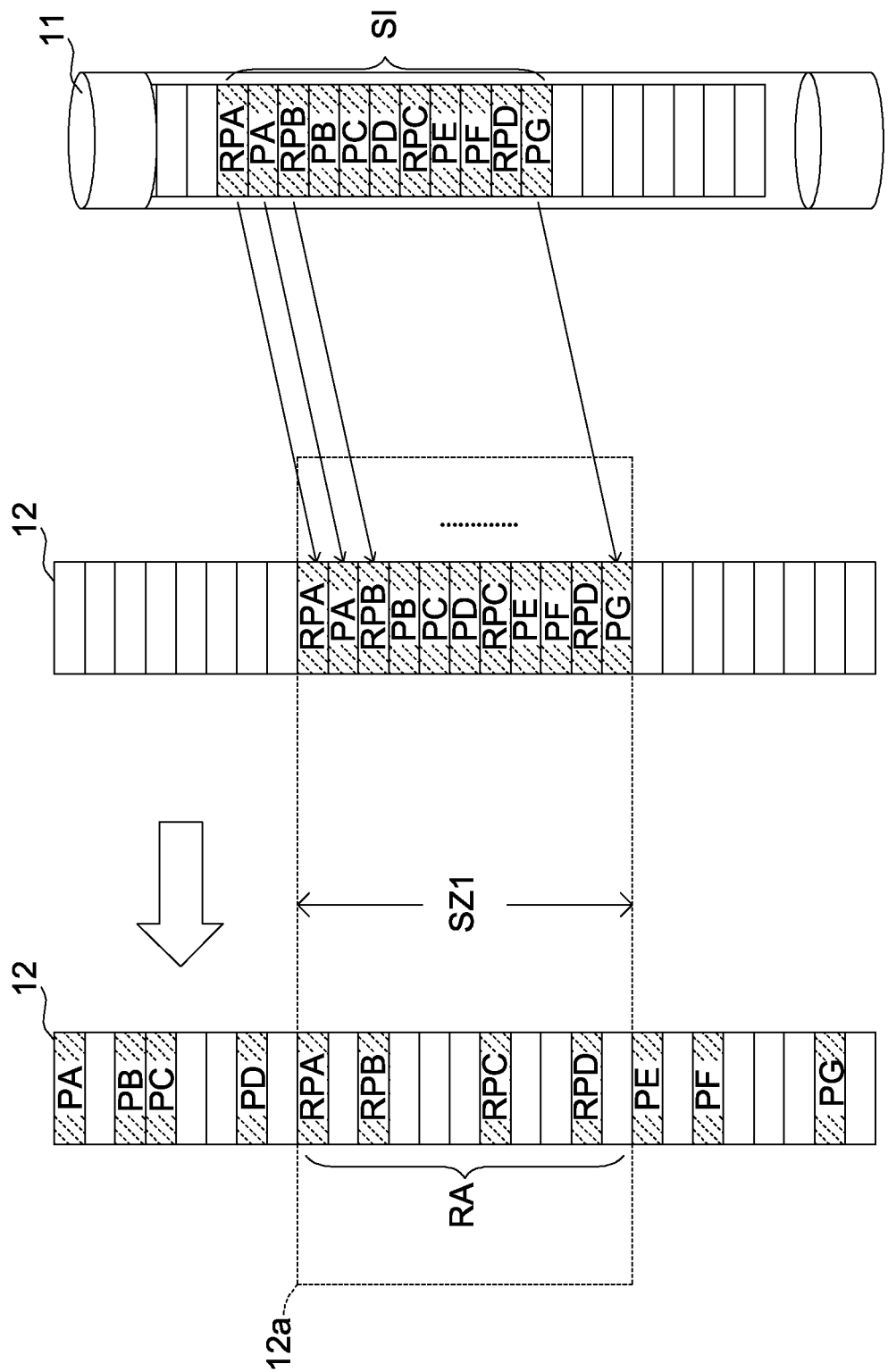
FIG. 15 shows a schematic view illustrating the main memory and the external storage during a resume process according to the fifth embodiment.
Figure 16:
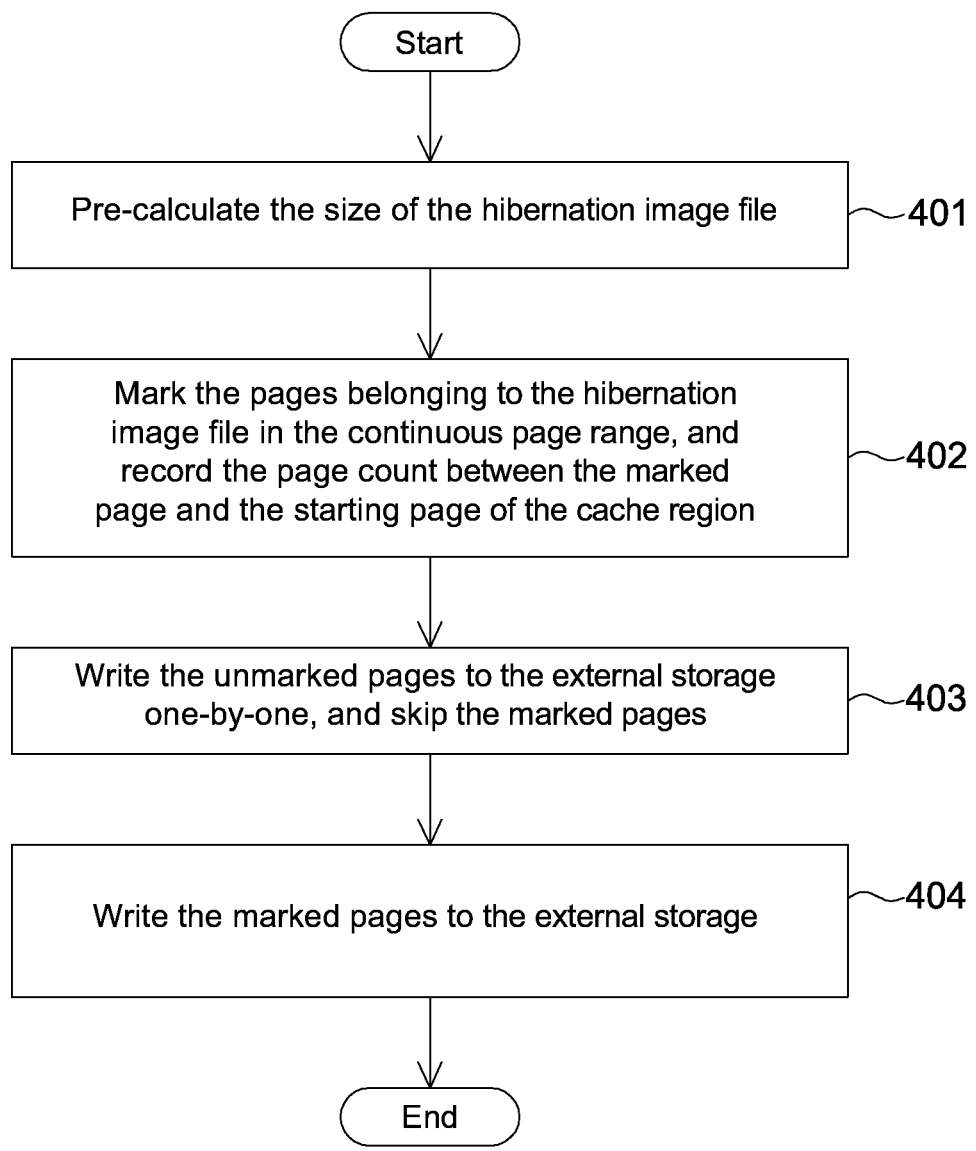
FIG. 16 shows a shutdown flow chart according to the fifth embodiment.

FIG. 14 shows a schematic view illustrating a main memory and an external storage during a hibernation process according to the fifth embodiment. FIG. 15 shows a schematic view illustrating the main memory and the external storage during a resume process according to the fifth embodiment. FIG. 16 shows a shutdown flow chart according to the fifth embodiment. Please refer to FIGS. 9, 14, 15 and 16. The shutdown process comprises the following steps. As shown in step 401, the processing unit 15 pre-calculates the size SZ1 of the hibernation image file SI. As shown in step 402, the processing unit 15 marks the pages belonging to the hibernation image file SI inside the continuous page range RA as the marked pages, and records the page count Pd which is count of pages from the starting page of the cache region 12a of the main memory 12 to the marked page. The page count Pd may be regarded as the $Pd^{th}$ page counting from the starting page of the cache region 12a. The pages belonging to the hibernation image file SI outside the continuous page range RA are unmarked pages. The continuous page range RA starts from the starting page of the cache block 12a of the main memory 12 to the size SZ1 of the hibernation image file SI. In the fifth embodiment, the marked pages comprise pages RPA-RPD, and the unmarked pages comprise pages PA-PG.

As shown in step 403, the processing unit 15 writes the unmarked pages to the external storage 11 one-by-one, and skips the marked pages before reaching the $Pd^{th}$ page. As shown in step 404, the processing unit 15 encounters the page count Pd which is count of pages from the starting page of the cache region 12a to the marked page, and writes the marked pages to the external storage 11. In other words, the processing unit 15 writes the $Pd^{th}$ page to the external storage 11 until the last page. That is, the processing unit 15 writes the pages RPA, PA, RPB, PB, PC, PD, RPC, PE, PF, RPD and PG to the external storage 11 one-by-one.

During the resume process, because the target pages of the pages PA-PG are not inside the cache region 12a, the page conflict would not occur. Although the target pages of the pages RPA-RPD are inside the cache region 12a, because the target pages of the pages RPA-RPD are the positions of the pages before the previous hibernation, the recovery is not needed.

Sixth Embodiment

Figure 17:
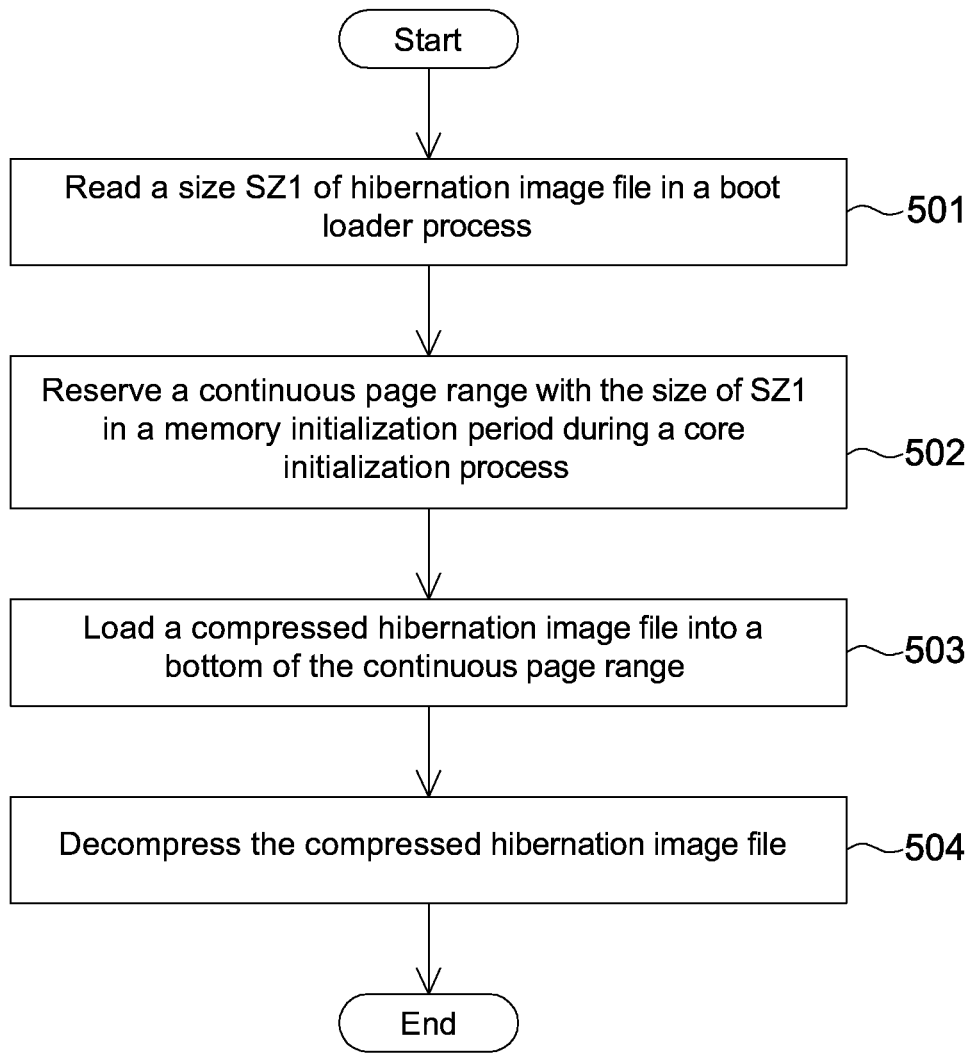
FIG. 17 shows a boot flow chart according to a sixth embodiment.

FIG. 17 shows a boot flow chart according to the sixth embodiment. Please refer to FIGS. 9 and 17. During the hibernation process, the processing unit 15 calculates the size SZ1 of the uncompressed hibernation image file SI, then generates a compressed hibernation image file using the compression method, and records the size SZ1 of the hibernation image file SI to the compressed hibernation image file. The boot process during the resume process comprises the following steps. As shown in step 501, the size SZ1 of the hibernation image file SI is read in a boot loader process. As shown in step 502, a continuous page range RA with the size of SZ1 is reserved in a memory initialization period during a core initialization process. As shown in step 503, the processing unit 15 loads the compressed hibernation image file into the bottom of the continuous page range RA. As shown in step 504, the compressed hibernation image file is decompressed. Furthermore, the processing unit 15 decompresses the compressed hibernation image files of the pages one-by-one, and sequentially fills the decompressed page contents from the first page of the cache region 12a, until the all pages of the compressed hibernation image file have been decompressed. The method of recovering to the target page after page decompression may be implemented in conjunction with the page recovering method of the third, fourth or fifth embodiment.

Seventh Embodiment

Figure 18:
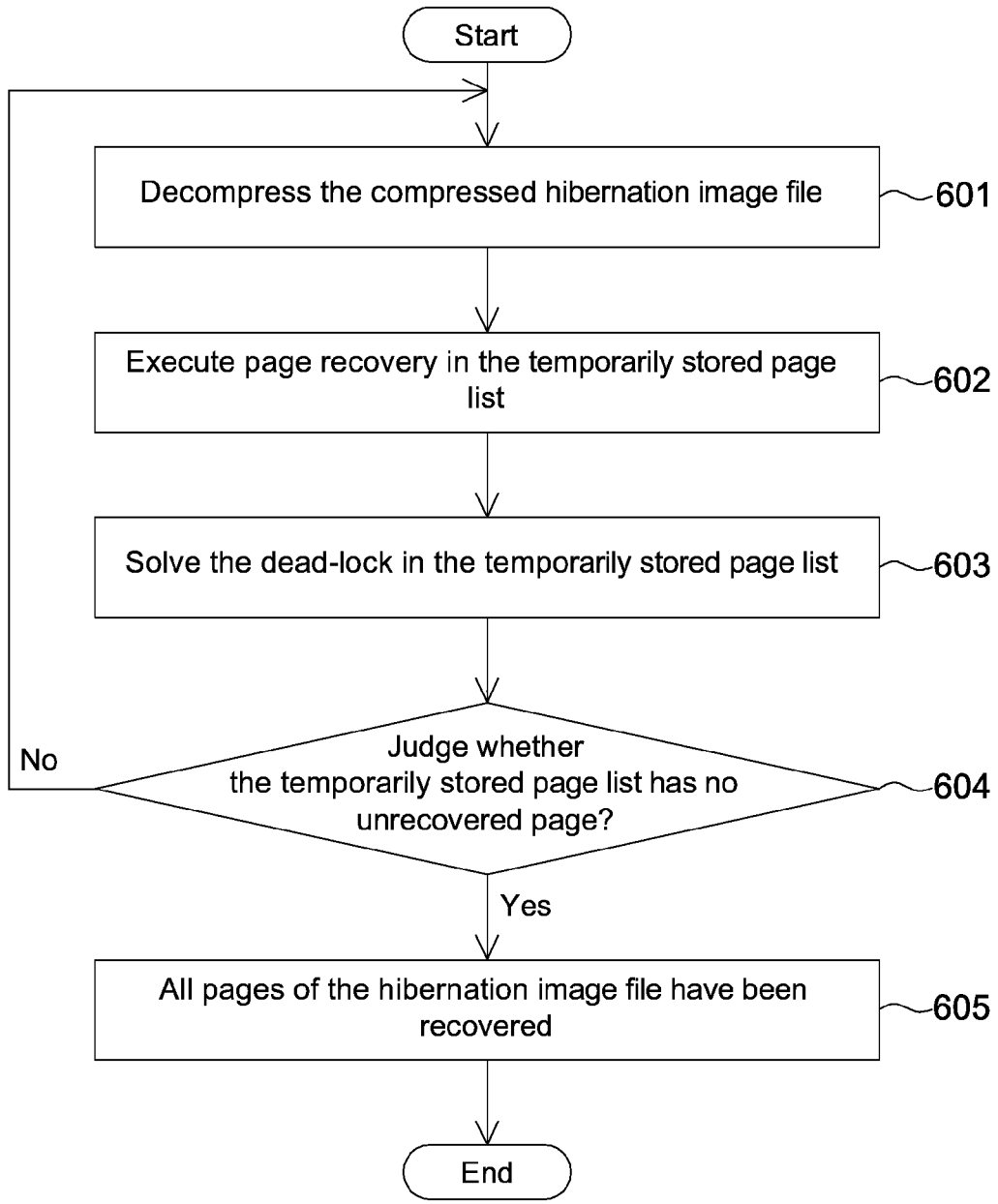
FIG. 18 shows a boot flow chart according to a seventh embodiment.
Figure 19:
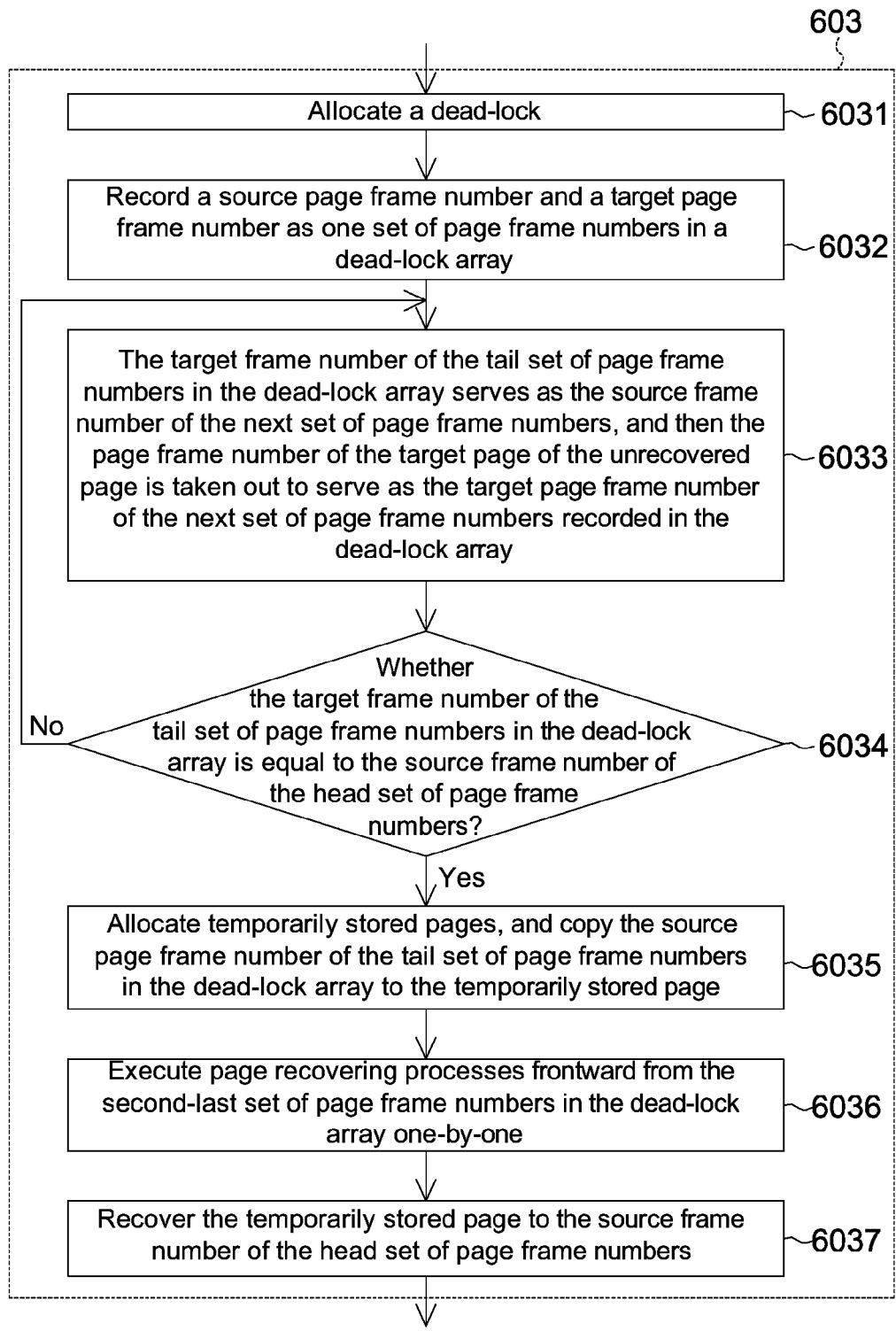
FIG. 19 shows a detailed flow chart of step 603.

FIG. 18 shows a boot flow chart according to the seventh embodiment. FIG. 19 shows a detailed flow chart of step 603. Please refer to FIGS. 9, 18 and 19. The resume process during the boot process comprises the following steps. As shown in step 601, the compressed hibernation image files are decompressed. In the step 601, a single central processing unit can be firstly used to read the headers of the pages of the compressed hibernation image files one-by-one. If the electronic apparatus 8 uses the multi-core processor, then the page decompressing jobs are assigned to other central processing unit, until the assignments of all page decompressing jobs are finished. The central processing unit firstly reads the target page frame number in the header of the allocated page, and then judges whether the target page can be recovered according to the target page frame number. If the target page can be recovered, then the decompressed page content is directly filled into the target page according to the page recovering method. On the contrary, if the target page cannot be recovered, then the decompressed page content is directly filled into the page in the temporarily stored page list.

As shown in step 602, the processing unit 15 executes the page recovery of the temporarily stored page list. The processing unit 15 checks whether the pages in the temporarily stored page list and the target page corresponding thereto can be recovered one-by-one. If the target page can be recovered, then the processing unit 15 fills the page content of the temporarily stored page list into the target page according the page recovering method. If the electronic apparatus 8 uses the multi-core processor, then one central processing unit is in charge of one page recovering job until the assignments of all pages recovering jobs are finished. If the remaining page in the temporarily stored page list has the dead-lock, then the subsequent step 603 executes the processing.

As shown in step the 603, the dead-lock in the temporarily stored page list is solved. The step 603 further comprises steps 6031-6037. As shown in the step 6031, the dead-lock is allocated. If the electronic apparatus 8 uses the multi-core processor, then one central processing unit is in charge of one dead-lock until the assignments of all dead-locks are finished. As shown in the step 6032, the source page frame number is set as the page frame number of the first unrecovered page, the target page frame number is set as the page frame number of the target page corresponding to the first unrecovered page, and the source page frame number and the target page frame number are recorded as one set of page frame numbers in the dead-lock array. As shown in the step 6033, the target page frame number of the tail set of page frame numbers in the dead-lock array serves as the source page frame number of the next set of page frame numbers, and then takes out the page frame number of the target page of the unrecovered page serves as the target page frame number of the next set of page frame numbers recorded in the dead-lock array. As shown in the step 6034, it is judged whether the target page frame numbers of the tail set of page frame numbers in the dead-lock array is equal to the source page frame numbers of the head set of page frame numbers. When the target page frame number of the tail set of page frame numbers in the dead-lock array is unequal to the source page frame numbers of the head set of page frame numbers, then the step 6033 is executed. When the target page frame numbers of the tail set of page frame numbers in the dead-lock array is equal to the source page frame numbers of the head set of page frame numbers, then the step 6035 is executed. As shown in the step 6035, the temporarily stored page is allocated, and the source page frame number of the tail set of page frame numbers in the dead-lock array is copied to the temporarily stored page. As shown in the step 6036, the page recovery processes are executed frontward one-by-one from the second-last set of page frame numbers in the dead-lock array. As shown in the step 6037, the temporarily stored page is recovered to the source page frame number of the head set of page frame numbers.

As shown in step 604, it is judged whether the temporarily stored page list has no unrecovered page. When the temporarily stored page list has unrecovered page, then the step 601 is executed. On the contrary, when the temporarily stored page list has no unrecovered page, then step 605 is executed. As shown in the step 605, the recovery of all pages of the hibernation image file is finished.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for resuming from hibernation, comprising:
during a hibernation process, writing, one-by-one, a plurality of pages from a main memory to an external storage to generate a hibernation image file, and a first page table associated with said pages is further updated to a second page table, wherein the first page table records the nonconsecutive positions of the pages in the main memory, and the second table records the positions of the continuous page range of the pages in the main memory; and
during a resume process, in a one-time transmission, writing the pages from the external storage to the continuous page range of the main memory according to a head of the hibernation image file, wherein the resume process is later than the hibernation process, and a size of the continuous page range of the main memory is the same as a size of the hibernation image file.

2. The method according to claim 1, wherein during the hibernation process, the pages are concentrated to the continuous page range to form a sequential page array, and then the hibernation image file is generated according to the sequential page array.

3. The method according to claim 2, wherein during the hibernation process, the first page table is updated to the second page table according to the sequential page array.

4. The method according to claim 2, wherein the continuous page range is a non-fixed memory address space and is formed by performing a page migration in a previous hibernation process.

5. The method according to claim 1, further comprising:
reserving the continuous page range in a core initialization process.

6. The method according to claim 5, wherein during the hibernation process, positions of the pages in the continuous page range are determined according to an order of the pages in the hibernation image file to update the first page table to the second page table.

7. The method according to claim 5, wherein the continuous page range is a fixed memory address space.

8. The method according to claim 1, wherein the pages are user space pages.

9. The method according to claim 1, wherein the external storage is a hard disk drive, a flash memory or a volatile memory.

10. An electronic apparatus, comprising:
an external storage;
a main memory;
an image generating circuit configured during a hibernation process, to write, one-by-one, a plurality of pages from the main memory to the external storage to generate a hibernation image file, and a first page table associated with said pages is further updated to a second page table, wherein the first page table records the nonconsecutive positions of the pages in the main memory, and the second table records the positions of the continuous page range of the pages in the main memory; and
a page moving circuit configured during a resume process, in one-time transmission, to write the pages from the external storage to the continuous page range of the main memory according to a head of the hibernation image file during a resume process, wherein the resume process is later than the hibernation process, and a size of the continuous page range of the main memory is the same as a size of the hibernation image file.

11. The electronic apparatus according to claim 10, wherein during the hibernation process, the image generating circuit concentrates the pages to the continuous page range to form a sequential page array, and then generates the hibernation image file according to the sequential page array.

12. The electronic apparatus according to claim 11, wherein the image generating circuit updates the first page table to the second page table according to the sequential page array during the hibernation process.

13. The electronic apparatus according to claim 11, wherein the continuous page range is a non-fixed memory address space and is formed by performing a page migration in a previous hibernation process.

14. The electronic apparatus according to claim 10, wherein the image generating circuit reserves the continuous page range in a core initialization process.

15. The electronic apparatus according to claim 14, wherein the image generating circuit determines positions of the pages in the continuous page range according to an order of the pages in the hibernation image file to update the first page table to the second page table.

16. The electronic apparatus according to claim 14, wherein the continuous page range is a fixed memory address space.

17. The electronic apparatus according to claim 10, wherein the pages are user space pages.

18. The electronic apparatus according to claim 10, wherein the external storage is a hard disk drive, a flash memory or a volatile memory.

* * * * *